Aug. 21, 1962 U. MONACO 3,050,109
PROCESS AND MACHINE FOR THE CONTINUOUS PRODUCTION
OF CORRUGATED LAMINATES OF PLASTIC MATERIALS
Filed Feb. 19, 1958 3 Sheets-Sheet 2

Aug. 21, 1962 U. MONACO 3,050,109
PROCESS AND MACHINE FOR THE CONTINUOUS PRODUCTION
OF CORRUGATED LAMINATES OF PLASTIC MATERIALS
Filed Feb. 19, 1958 3 Sheets-Sheet 3
FIG. 4
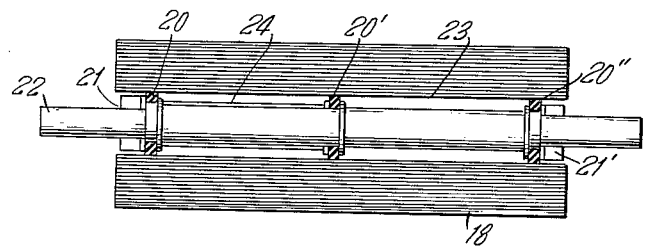
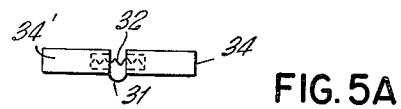
FIG. 5A
FIG. 5
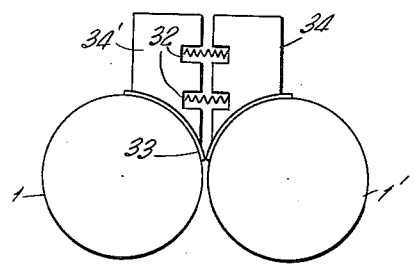
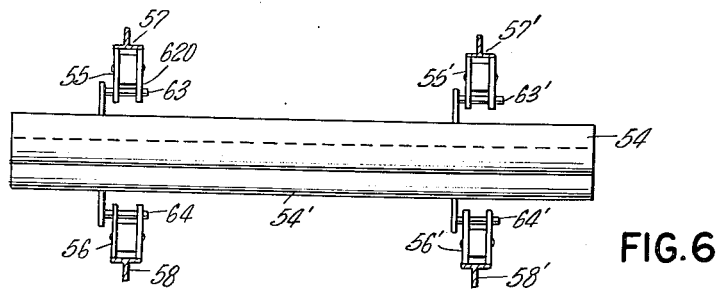
FIG. 6
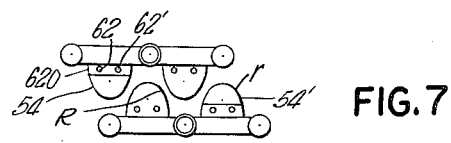
FIG. 7

United States Patent Office 3,050,109
Patented Aug. 21, 1962

3,050,109
PROCESS AND MACHINE FOR THE CONTINUOUS PRODUCTION OF CORRUGATED LAMINATES OF PLASTIC MATERIALS
Ugo Monaco, Castellanza, Italy, assignor to Montecatini Società Generale per l'Industria Mineraria e Chimica, Milan, Italy, a corporation of Italy
Filed Feb. 19, 1958, Ser. No. 716,102
Claims priority, application Italy July 8, 1957
9 Claims. (Cl. 156—588)

This invention in part relates to a continuous process for the production of corrugated sheets of reinforced plastic, in particular of a glass-fibre-polyester resin laminate.

The invention also relates to a machine to carry out this process. Machines for the continuous production of corrugated laminates of a reinforced plastic material have already been proposed in which the continuous die for impressing the corrugations on the laminate consists of two endless tracks each composed of a series of parallel rollers having the same radius and pitch as the corrugations. However, the product obtained with such machines is likely to be full of air blisters, and presents non-uniform thicknesses and corrugations with a form varying from the center to the edges of the laminate.

The main objects of the present invention are to provide a process and a machine which make it possible to obtain corrugated laminates of reinforced plastics free of the aforementioned drawbacks. The present invention is an improvement upon that described in Ugo Monaco application Serial No. 380,247, filed September 15, 1953. There is some common subject matter.

It has now been found that, by arranging the bearing chains in respect of the shaping elements, so that they support said elements in such a fashion that a minimum deformation occurs as a consequence of flexural stresses on the shaping elements caused by shrinking of the covering flexible films, the uniformity in form of the corrugations, both at the edges and at the center of the laminate is assured. It has further been found that it is desirable that the laminate be firmly supported at each point by at least the metal surface of the shaping elements. This moderates the exothermic course of the polymerization reaction. It is advantageous that the shaping elements also assure support for the laminate in the connection portions of the corrugations. More particularly, this connection, instead of being normal or straight, is realized by means of two arcs, having a large radius, so that the laminate tension causes the laminate to adhere also to these connections. More uniform thickness is thus assured.

Elements having another shape can easily be substituted for the shaping elements by withdrawing the latter from one side of the machine, there being no need for completely demounting the tracks.

The present invention will be described with reference to the accompanying diagrammatic drawing in which:

FIG. 4 is a vertical, lengthwise section of the mounting means of a bobbin or roll;

FIG. 5 is a transverse section of a retaining wall for the impregnation resin, and the press rollers of the impregnation device.

FIG. 5A is a top view of the retaining wall of FIG. 5; the retaining walls serve as lateral retaining means for the resin supplied to the impregnation cylinders of FIG. 1;

FIG. 6 is a side view of the two shaping or corrugating elements; and

FIG. 7 is a detail, being a longitudinal section showing four shaping elements carried by the chains of the two tracks.

Figure 1:
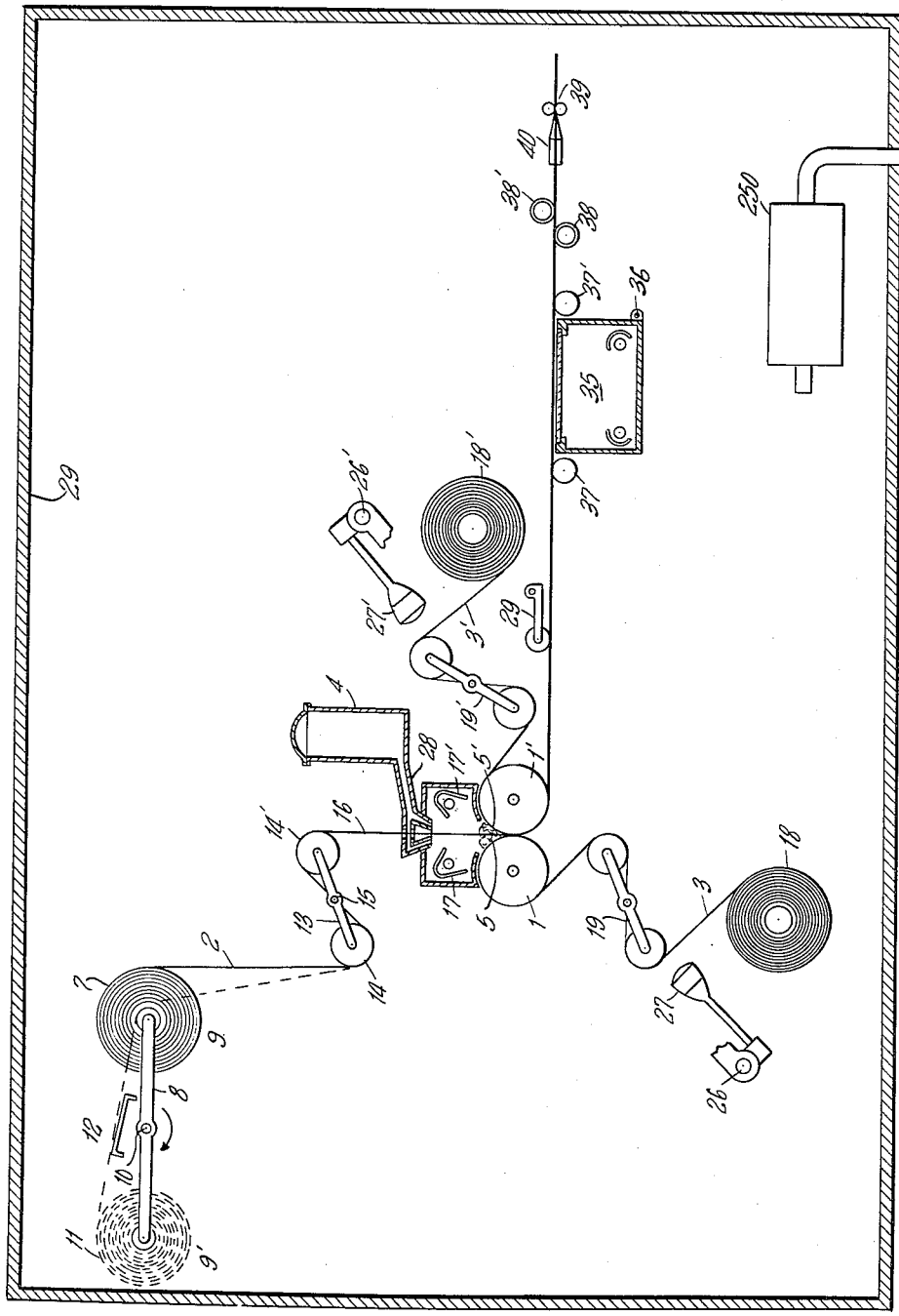
FIG. 1 is a vertical, longitudinal section of a chamber in which operations preliminary to the polymerization of the resin are performed.
Figure 2:
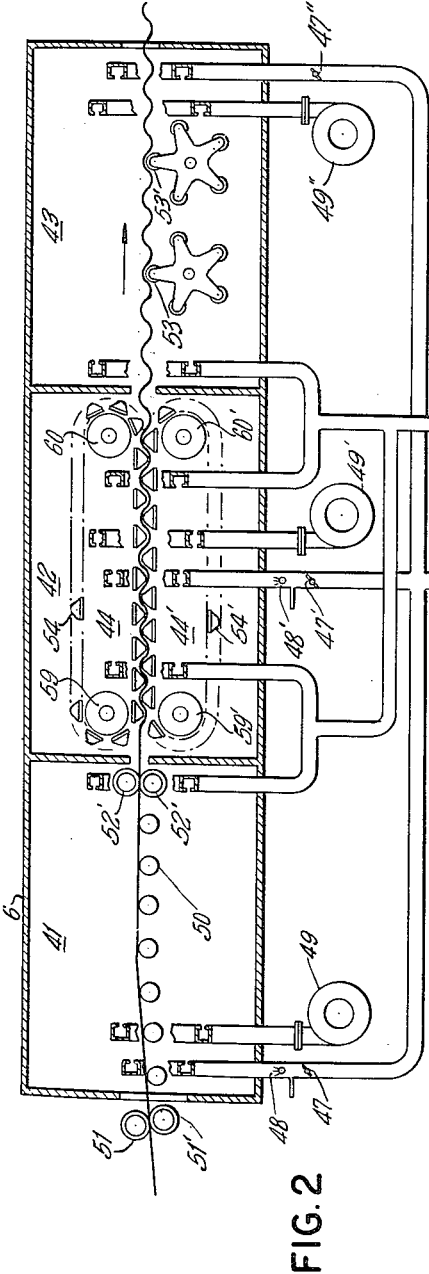
FIG. 2 is a like section of the polymerization chamber.
Figure 3:
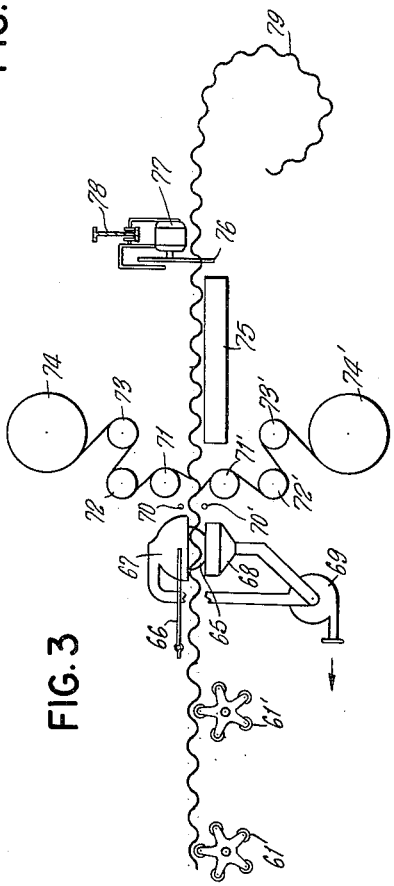
FIG. 3 is a like section of the chamber in which terminal finishing operations take place.

FIGURES 1, 2 and 3, when aligned in that order, represent a longitudinal central section of the apparatus system. The three structures are preferably joined, to leave no intermediate spacing. The over-all process is as follows. It comprises passing glass fiber mat 2 (FIG. 1) and outer cellophane protecting sheets 3, 3' together between combining rollers 1, 1' (FIG. 1), feeding two resin beads 5 and 5' from resin tank 4 to the rollers 1, 1', and then passing the impregnated glass fiber mat, sandwiched between the cellophane sheets, through and enclosed in polymerization chamber 6 (FIG. 2) where it is shaped and cured. A more detailed description follows.

The glass mat roll 7 is carried by pivoted support 8 which provides two supporting positions 9 and 9' for the mat roll. The pivot is at 10. This facilitates the connection, during operation, of the sheet end of roll 7 to the initial part of the sheet of roll 11. The run of the mat indicated by dotted line is that taken off roll 11. In order to facilitate the joining operation, which can be carried out either with adhesive or by sewing, a supporting table 12 is made available. After the joining has been carried out the supporting table 12 is removed, and the new roll 11 is brought into its working position by rotating support 8 of the rolls around its pivot 10, in the direction of the arrow. In this way the waste of time and materials, which would occur if the machine had to be stopped for each change of rolls, is avoided. Instead of feeding the machine with rolls prepared separately, the machine can be fed continuously by another machine, placed in series, producing a continuous sheet of glass mat, or of another type, by known processes. The tension of the sheet unwinding from the roll is obtained by passing it around a winding frame consisting of two smooth cylinders 14, 14', carried rigidly by a framework 13 pivoted in 15. By rotating said framework, the angle of contact between the sheet and the cylinders, and therefore the sheet tension, can be regulated as desired. The arrangement should be such that the sheet is substantially vertical in the portion 16 of the run, immediately preceding entry between the impregnation rollers 1, 1'.

Immediately before it passes between the combining rollers 1, 1' the mat sheet is heated by infrared radiators 17, 17' of the type employing linear radiator elements, whose power can preferably be varied from 300 to 1500 w. per linear meter, to suit the material and working speed.

The action of these radiators is very important, in order to obtain a laminate that is free of air blisters and which has good transparence, since in this way the water that is always held at the surfaces of the glass fiber is eliminated. Therefore better wetting of the fibers is obtained. The wetting is also facilitated by the fact that the resin, which should be made to penetrate between the fibers, is fluidized by the heat of the warmed mat.

The cellophane films unwinding from rolls 18, 18' must be subjected to a tension higher than that of the glass mat. Therefare the roll axles are braked, by known means not shown in the figure. The cellophane sheets are then passed around winding frames 19, 19', which are similar to those described for the mat unwinding, and are then passed around the impregnation rollers 1 and 1'. Owing to the great length of the cellophane rolls devices for joining the working roll are not necessary. In order to assure perfect unwinding of the cellophane eccentricity and deflection of the rolls should be avoided. They are preferably mounted on axles which block the cellophane roll core by means of expansion joints, one of which is also present in the middle of the axle, to avoid the deflection of the roll core.

This mounting system of the rolls is shown in FIG. 4. The rubber rings 20, 20', 20" are respectively pressed by nut 21, cylindrical spacer 24, and nut 21'. The rings also function as joints between axle 22 and the roll core 23, and as centering means and side and central supports.

In order to assure perfect unwinding of the cellophane film, all of the run during which the cellophane film is exposed to air, before entering the polymerization chamber, is enclosed in chamber 25, which is kept, by suitable conventional means 250 at a relative humidity near that at which the cellophane rolls were prepared. However, in order to correct local faults which are often present in the cellophane rolls, there are provided two bars 26, 26' on which one or more infrared lamps 27, 27' can be fixed in the positions required.

As stated above the impregnation of the fibrous reinforcing layer takes place between metal rollers 1, 1'. These have a diameter between 300 and 400 mm. and are of the rigid type characteristic of these squeezing rollers. They are provided with the usual mechanisms for regulating their distance apart. The rollers can be cooled inside with water, to permit operation at room temperature, and also with resins of short life, that is, non-stable at higher temperatures.

Cylinders 1, 1' are actuated by an electric motor (not shown) the speed of which is automatically regulated by the "feeling device" 29 (FIG. 1), in correlation with the speed of the corrugating apparatus, and with the desired tension. The height of the cylinders is slightly lower than that of cellophane, in order to avoid contact of the cylinders with the resin.

The resin passes to the rollers from tank 4 through the open channels 28, which permit easy cleaning. Tank 4 is designed so that the preparation of the resin and its de-aeration under vacuum, after mixing, can be carried out therein, and it is lifted into its working position by a tackle, not shown in the figure, which serves also for moving the rolls. The tank is provided with a filter, which prevents the passage of possible foreign matter, and with a suitable flow regulator, neither shown on the drawing.

Figure 5B:
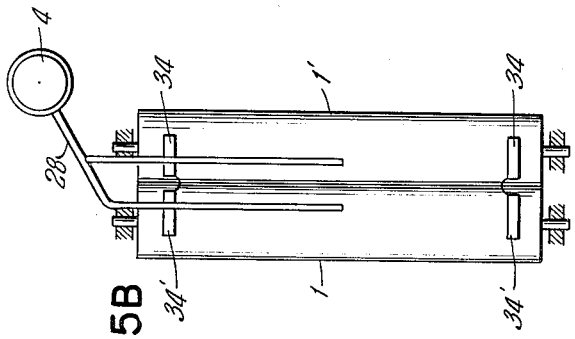
FIG. 5B is a horizontal section of the resin-applying chamber and a top view of the channels through which the resin passes to the impregnation cylinders.

In order to obtain the most satisfactory impregnation, the two resin beads 5, 5', which are formed at both sides of the descending mat, should preferably be as high as possible. The machine is therefore provided with two retaining devices, each formed by two cheeks 34, 34' (FIG. 5). Each cheek is shaped very closely to the curve of the cylinders. Two springs 32 keep them spaced apart, each cheek being pressed toward its cylinder. Across the space between the two cheeks is a flexible membrane 31 (FIG. 5A), of polyvinyl alcohol polymer or of any other material insoluble in the resin, to render the whole resin-tight. The membrane 31 has a tongue extension 33 which provides a seal beyond the contact line of the cylinders. In this way there are no operating difficulties, even with more fluid resins, which are preferred, in order to obtain good impregnation.

As explained in the copending application, the glass fiber mat preferably should not be unduly stressed while wet with resin. The type of impregnation adopted avoids this to a substantial degree. The impregnation assembly is similar in some respects to that shown in FIG. 3 of the copending application.

After the impregnation and the coupling with cellophane, the material is advanced horizontally for a certain, or predetermined, distance before entering the polymerization chamber. During the advance through this distance it runs above an inspection table 35, whose upper plane of ground glass, lighted upwards, uniformly, permits easy control of the impregnation. The inspection table is slightly narrower than the cellophane sheet. It is pivoted at 36 so that it may be easily removed from the laminate if this should break. The two rollers 37, 37' support the laminate in this part of the run, thus avoiding its sliding on the inspection table. The pair of extending rollers 38, 38' serves to supply the well stretched laminate ot the margining device 39. The extending rollers are of a type commonly used in the textile machines. They comprise cylinders carrying a double screw having the origin in the center and rotating in a direction which tends to displace the possible wrinkles towards the edges. The margining device 39, known per se, serves to prevent the escaping of the resin from the edges. It applies a folded adhesive tape 40 to the edges of the laminate. However, margining can be realized more simply, although with less safety, by folding the edges of the cellophane sheet, or by applying sufficiently wide non-adhesive cellophane tapes.

The laminate then enters the polymerization chamber 6. This is divided into three zones designated 41, 42, 43, which are kept at different temperatures. The reasons for the division of chamber 6 into three zones are that a laminate having better transparency and properties is obtained if the heating of the laminate is carried out gradually, and also that it is convenient to limit the continuous shaping apparatus 44, 44', which is one of the most expensive parts of the machine, to the zone where it is needed, that is, to the intermediate zone where the material is cured.

The first zone 41 therefore has a preheating function, the second zone 42 is the true polymerization zone, and the third zone 43 is the post-curing or annealing zone. The temperatures employed in these three zones essentially depend upon the type of resin and catalyst employed. For example, with the polyester resins more commonly used, mixed with 1–2% benzoyl peroxide as a catalyst, the temperature of the first zone is 70–80° C., that of the second zone is 80–90° C. and that of the third zone is 95–100° C. It has been found convenient to heat these three zones by forced air circulating in a closed cycle, said air being drawn by fan 45 (FIG. 2), passed through heat exchanger 46 and then introduced into the three sections 41, 42 and 43. Each of these sections receives the needed amount of air, controlled by dampers 47, 47', 47". A suitable arrangement of the delivery and suction ducts provides uniform transverse and vertical distribution of temperature in the chambers.

The humidifiers indicated at 48, 48' maintain the desired degree of humidity in the chamber 41, 42 in order to control or prevent shrinking of the cellophane, and are automatically regulated by suitable humidity control devices (not shown in the figures) placed in said chambers. The temperature of the warm air is automatically controlled by a thermostat (not shown) placed after the heat-exchanger 46.

The temperature regulation in the chambers 41, 42, 43 is carried out by means of cold air blown into each chamber by fans 49, 49', 49" each actuated by a thermostat (not shown) placed in each chamber respectively. In this way there is obtained an immediate reaction to any temperature variations which may occur, due to the exothermic nature of the polymerization reaction.

In the zone 41 the laminate is supported by a series of rollers 50 arranged to form a slightly arcuate or arched path, so that the laminate is firmly supported by each roller.

At the inlet and outlet of zone 41 there are provided two pairs of extending rollers 51, 51' and 52, 52', similar to those already described. Their purpose is to avoid the shrinking of the cellophane due to the drier air of the chamber 41. This can cause the formation of wrinkles. The polymerization chamber 42 contains the shaping apparatus. The apparatus 44, 44' produces a laminate with corrugations perpendicular to the advancing direction of the laminate. The tracks, generally designated 44, 44' (FIG. 2) are each formed by two roller chains 55, 55' and 56, 56' (FIG. 6) whose links carry tongues for the connection of the shaping elements 54 and 54'. These chains are of a type commonly used for construction of conveyors. The chain rollers run on guides 57, 57' and 58, 58' and engage in suitable sprocket wheels carried by the axles 59, 59' and 60, 60' (FIG. 2) at the end of their run. Axles 60 and 60' are driving axles and provide for the advancement of the tracks. Guides 58, 58' and the supports of axles 59' and 60' are rigidly affixed to the machine. Guides 57, 57' and the supports of axles 59 and 60 are part of an independent frame-work (not shown) which can be vertically displaced by screws in order to closely regulate the distance between the shaping elements.

Each of the tongues 620 (FIG. 7), carried by the links of the chains 55, 55' and 56, 56', is provided with two bores 62, 62' in which the pivot pins 63, 64 (FIG. 6) carried by the shaping elements 54, 54' engage. The shaping elements can therefore be disconnected easily and exchanged for other elements having a different shape, by withdrawing them from one side of the machine, without any need for disassembling the tracks completely. A release or safety locking device (not shown), of a known type, prevents the occasional disconnecting of the shaping elements.

The position of the chains in respect to the shaping elements is so chosen that they support said elements in such a fashion that a minimum deformation occurs as a consequence of flexural stresses on the shaping elements. Such stresses are caused by the shrinking of the cellophane. Pivots 63, 64 are therefore placed at a horizontal distance from the middle line corresponding to about 3/10 of the maximum width of the laminate. This assures the uniformity of shape of the corrugations both at the edges and at the center of the laminate. The form of the shaping elements depends on the desired shaped to be imparted to the laminate corrugations. However it has been observed that it is convenient that the following conditions be satisfied. The laminate should be firmly supported at each point by one metal surface of the shaping elements in order to moderate the exothermic course of the polymerization reaction. In order to form corrugations consisting of circular portions connected to each other, it is preferable that the shaping elements also support the laminate in the connection portion as shown in FIG. 7. Instead of having straight parallel sides, the latter are comprised of two arcs having a comparatively large radius R, so that the tension of the laminate makes it to also adhere to these connections or connecting portions. Radius R is preferably larger than radius $r$, the ratio $$\frac{r}{R}$$

being about $$\frac{1}{10}$$

whereby radius $r$ ranges from about 3 to about 80 millimeters and radius R from about 30 to about 800 millimeters. Greater uniformity in thickness is thus assured. The average thickness of the corrugated laminate varies from 0.5 to 3 millimeters.

The shaping elements are made of drawn sheet metal. However they may also be realized with, or constructed in, suitable shapes.

Axles 60, 60' (FIG. 2) are actuated by a variable speed electric motor (not shown). The stay of the laminate in all three chambers can vary from 15 minutes to about 1 hour.

The post-curing or annealing chamber 43 is traversed by the laminate, which is supported by rollers 53, 53'. The roller surfaces have the same pitch or curvature as the laminate and move at a peripheral speed equal to the translational speed of the laminate. The latter is thus not subjected to tensile or flexural stresses at a stage at which it has not yet reached its maximum mechanical strength. The cured laminate, after leaving the post-curing chamber, advances freely again for two or three minutes in the air in order that it be cooled before being subjected to the side cutting operation. In this zone (FIG. 3) the laminate is supported by rollers 61, 61', which are similar to rollers 53, 53'.

In FIGURE 3 is shown the longitudinal cutting device consisting of the sanding or abrasive disks 65, of which there are two placed at the respective sides of the laminate. Each disk is actuated by a separate motor and is mounted on an oscillating arm 66 so that they can approach or leave the laminate at will. Each disk is protected by a guard 67. The guard and the receiver, or throat, 68 are connected with exhaust fan 69 which scavenges the dust produced by the side cutting operation.

There now follows the device for recovering or removing the cellophane. This consists of two humidifiers 70, 70', the rollers 71, 72, 73 and 71', 72' and 73', and the winding devices 74, 74', controlled by means of friction joints of a known type (not shown).

After this, the laminate arrives at inspection table 75, consisting of a ground glass plate suitably and uniformly lighted, upwardly, on which an operator can carry out the detection of faults, the measurement of the product, and its subdivision. To accomplish the last purpose, immediately after the inspection table there is disposed a transverse cutting device. This device consists of a cutting disk 76, actuated by motor 77 and sliding on a transverse guide 78. A device, not shown, of a type known for similar processes, synchronizes the advancing of the disk on the guide and the advancing of the guide in the direction of advance of the laminate, in order to obtain a cut exactly perpendicular to the laminate edges. Finally, there is the winding device 79, also controlled through a suitable friction joint (not shown). In the case of corrugated laminates the reinforcement chiefly used is a glass fiber sheet or mat, or a plurality of them.

In accordance with the present invention, that is, in the process and the machine hereinbefore described, there may be employed fibrous sheets of any kind and texture, especially fabrics of glass, or of other fibers, natural or artificial, or mats, paper boards, or papers made of any of said fibers. Wire nets of various types can also be used.

The resins chiefly used comprise linear unsaturated polyesters and polymerizable monomers, usually known as polyester resins. However any resin having the property of being polymerized by action of suitable catalysts and/or heat, without releasing volatile products and preferably without the use of pressure, can be used for this purpose. Suitable types of resins are described in my copending application Serial No. 380,247, filed September 15, 1953. Fillers, dyes and pigments can be added to the resins, depending on the desired effects. The details as to resin mixtures, temperatures, catalysts, resident time in the polymerization chamber etc., which are described in my prior application, are incorporated herein by reference, being utilizable here in the same manner.

The following composition is a non-limiting example of polyester resins that can be satisfactorily used in the production of the reinforced shape rolled plastic material according to the present invention.

| Polyester: | Percent |
|---|---|
| 60% mono ethyleneglycol maleate | } 75 |
| 40% mono ethyleneglycol phthalate | |
| Styrene | 25 |
| Benzoyl peroxyd | 1 |

The viscosity of the mixture should be neither too high (giving a resin difficult to handle) nor too low (a resin easily spreading out from the sides), but should be of the order of 4 to 6 poises.

It has been found advisable to disperse the benzoyl peroxyd into an equal quantity of tricresyl phosphate, which results in a paste.

As a reinforcement, mats of different weights per sq. meter are used. Good results are obtained with mat weighing about 450 gr./sq. m., having fibers of a medium 5 cm. length, preferably sized with soluble polyester resins.

I claim:

1. A polymerization apparatus for continuous production of a corrugated sheet of polymerized resin-reinforced material, comprising a pair of endless belts having adjacent portions travelling in the same longitudinal direction, means for mounting and turning the belts, means for supporting the material, coated with a thermosetting resin forming substance, for travel between the said adjacent portions of the belts, the belts carrying transverse, corrugation-forming, non-rotary shaping elements, the shaping elements of the respective belts interdigitating in said adjacent portions, the said elements also serving to draw the material along, the belts comprising generally horizontally disposed chain belts, support means carried by respective chains, each support means having a plurality of transversely directed, longitudinally spaced bores, pin means fixedly carried by each non-rotary element, said pin means being engaged in the respective bores, the pin means having their axes disposed at a set horizontal distance from the middle line corresponding to about $3/10$ of the maximum width of the laminate.

2. A polymerization apparatus for continuous production of a corrugated sheet of polymerized resin-reinforced material, comprising a pair of endless belts having adjacent portions travelling in the same longitudinal direction, means for mounting and turning the belts, means for maintaining the material under tension and for supporting the material, coated with a thermosetting resin-forming substance, for travel between the said adjacent portions of the belts, the belts carrying transverse, corrugation-forming, non-rotary shaping elements, the shaping elements of the respective belts interdigitating in said adjacent portions, the said elements also serving to draw the material along, and temperature and humidity control means for carrying out the polymerization, the belts comprising chain belts, transversely spaced support means fixed to respective chains, each support means having a plurality of longitudinally spaced recesses, a plurality of transversely extending, transversely spaced pins carried by each shaping element, the pins for each shaping element being laterally insertable into and removable from the recesses by lateral movement of the respective shaping element, to facilitate replacement, the shaping elements having a material-contacting surface which in cross-section is comprised of two similar lateral, outwardly convex, circular arcs, and a longitudinal outwardly convex circular arc smoothly connecting the first two arcs, the respective interdigitating shaping elements of the two belts being positioned closely adjacent each other so that the material is in maximum contact with the shaping elements as the resin-forming material is being polymerized, the shaping elements comprising heat-conductive material.

3. A polymerization apparatus for continuous production of a corrugated sheet of polymerized resin-reinforced material, comprising a pair of endless belts having adjacent portions travelling in the same longitudinal direction, means for mounting and turning the belts, means for supporting the material, coated with a thermosetting resin-forming substance, for travel between the said adjacent portions of the belts, the belts carrying transverse, corrugation-forming, non-rotary shaping elements, the shaping elements of the respective belts interdigitating in said adjacent portions, the said elements also serving to draw the material along, the belts comprising chain belts, means for supporting the shaping elements and for keeping them from rotating, the latter means comprising first transversely spaced support means carried by the respective chains, and second transversely spaced support means carried by respective forming elements, the second transversely spaced support means each being fixed upon a surface of the forming element that is off the working face of said element, the second support means being laterally spaced outwardly from the middle section of the respective forming means, and also inwardly of the ends of the latter so that the effect of bending stresses in the middle section is diminished.

4. The apparatus defined in claim 3, the second support means for each forming element comprising a pair of support elements each affixed to said forming element at a distance from the center point of the length of the forming element that is not greater than about three-tenths of the said length.

5. A polymerization apparatus for continuous production of a corrugated sheet of polymerized resin-reinforced material, comprising a pair of endless belts having adjacent portions travelling in the same longitudinal direction, means for mounting and turning the belts, means for supporting the material, coated with a thermosetting resin-forming substance, for travel between the said adjacent portions of the belts, the belts carrying transverse, corrugation-forming, non-rotary shaping elements, the shaping elements of the respective belts interdigitating in said adjacent portions, the said elements also serving to draw the material along, and temperature and humidity control means for carrying out the polymerization, the belts comprising chain belts, means for supporting the shaping elements and for keeping them from rotating, the latter means comprising transversely spaced support means fixed to respective chains, each support means having a plurality of longitudinally spaced recesses, a plurality of transversely extending, transversely spaced pins carried by each shaping element, the pins for each shaping element being laterally insertable into and removable from the recesses by lateral movement of the respective shaping element, to facilitate replacement, the said pins each being fixed upon a surface of the forming element that is off the working face of said element and being laterally spaced outwardly from the middle section of the respective forming means, and also inwardly of the ends of the latter so that the effect of bending stresses in the middle section is diminished.

6. The apparatus defined in claim 3, the forming elements being smooth curved and narrowed U-shaped in profile section.

7. A polymerization apparatus for continuous production of a corrugated sheet of polymerized resin-reinforced material, comprising a pair of endless belts having adjacent portions travelling in the same longitudinal direction, means for mounting and turning the belts, means for maintaining the material under tension and for supporting the material, coated with a thermosetting resin-forming substance, for travel between the said adjacent portions of the belts, the belts carrying transverse, corrugation-forming, non-rotary metallic, profile bars, the bars of the respective belts interdigitating in said adjacent portions, the said bars also serving to draw the material along, and temperature and humidity control means for carrying out the polymerization, the belts comprising chain belts, means for supporting the bars and for keeping them from rotating, the latter means comprising support means fixed to respective chains, the bars being smooth curved and narrowed U-shaped in profile section.

8. A polymerization apparatus for continuous production of a corrugated sheet of polymerized resin-reinforced material, comprising a pair of endless belts having adjacent portions travelling in the same longitudinal direction, means for mounting and turning the belts, means for maintaining the material under tension and for supporting the material, coated with a thermosetting resin-forming substance, for travel between the said adjacent portions of the belts, the belts carrying transverse, corrugation-forming, non-rotary metallic, profile bars, the bars of the respective belts interdigitating in said adjacent portions, the said bars also serving to draw the material along, and temperature and humidity control means for carrying out the polymerization, the belts comprising chain belts, means for supporting the bars and for keeping them from rotating, the latter means comprising support means fixed to respective chains, the bars being smooth curved and narrowed U-shaped in profile section, each profile bar providing a material supporting and corrugating surface which, in section, has the form of two outwardly convex circular arcs smoothly merging into and joining another circular arc having a smaller radius than those of the first-mentioned arcs.

9. A polymerization apparatus for continuous production of a corrugated sheet of polymerized resin-reinforced material, comprising a pair of endless belts having adjacent portions travelling in the same longitudinal direction, means for mounting and turning the belts, means for maintaining the material under tension and for supporting the material, coated with a thermosetting resin-forming substance, for travel between the said adjacent portions of the belts, the belts carrying transverse, corrugation-forming, non-rotary metallic, profile bars, the bars of the respective belts interdigitating in said adjacent portions, the said bars also serving to draw the material for maintaining the material under tension and for supporting the bars and for keeping them from rotating, the latter means comprising support means fixed to respective chains, the bars being smooth curved and narrowed U-shaped in profile section, each profile bar providing a material supporting and corrugating surface which, in section, has the form of two outwardly convex circular arcs smoothly merging into and joining another circular arc having a smaller radius than those of the first-mentioned arcs.

References Cited in the file of this patent

UNITED STATES PATENTS

| | | |
|---|---|---|
| 1,195,408 | Smith | Aug. 22, 1916 |
| 1,251,879 | Ford | Jan. 1, 1918 |
| 1,784,797 | Weinheim | Dec. 9, 1930 |
| 2,266,029 | Haines | Dec. 16, 1941 |
| 2,350,996 | Atkinson et al. | June 13, 1944 |
| 2,496,911 | Green | Feb. 7, 1950 |
| 2,526,945 | Gray | Oct. 24, 1950 |
| 2,528,168 | Paulsen | Oct. 31, 1950 |
| 2,556,011 | Swayze et al. | June 5, 1951 |
| 2,629,424 | Stegemann | Feb. 24, 1953 |
| 2,663,351 | Osborne et al. | Dec. 22, 1953 |
| 2,695,652 | Segil | Nov. 30, 1954 |
| 2,732,886 | Andreoli et al. | Jan. 31, 1956 |
| 2,784,763 | Shorts | Mar. 12, 1957 |
| 2,939,509 | Hoffman | June 7, 1960 |